US012290909B2

(12) United States Patent
Hirooka et al.

(10) Patent No.: US 12,290,909 B2
(45) Date of Patent: May 6, 2025

(54) NAILING MACHINE

(71) Applicant: FREAK CO., LTD., Sakai (JP)

(72) Inventors: Makoto Hirooka, Sakai (JP); Hiroshi Fujii, Sakai (JP)

(73) Assignee: FREAK CO., LTD., Sakai (JP)

( * ) Notice: Subject to any disclaimer, the term of this patent is extended or adjusted under 35 U.S.C. 154(b) by 0 days.

(21) Appl. No.: 17/927,381

(22) PCT Filed: Nov. 10, 2021

(86) PCT No.: PCT/JP2021/041262
§ 371 (c)(1),
(2) Date: Nov. 23, 2022

(87) PCT Pub. No.: WO2023/084622
PCT Pub. Date: May 19, 2023

(65) Prior Publication Data

US 2024/0238955 A1 Jul. 18, 2024

(51) Int. Cl.
*B25C 1/06* (2006.01)
*B25C 1/00* (2006.01)
*B25C 1/04* (2006.01)

(52) U.S. Cl.
CPC ................ *B25C 1/06* (2013.01); *B25C 1/003* (2013.01); *B25C 1/047* (2013.01)

(58) Field of Classification Search
CPC .. B25C 1/06; B25C 1/003; B25C 1/04; B25C 1/041; B25C 1/043; B25C 1/047
See application file for complete search history.

(56) References Cited

U.S. PATENT DOCUMENTS

2008/0210734 A1* 9/2008 Uejima .................. B25C 1/003 227/129
2009/0266863 A1 10/2009 Ishida et al.
2011/0198381 A1* 8/2011 McCardle ................ B25C 1/06 227/8

FOREIGN PATENT DOCUMENTS

JP 2007-090506 A 4/2007
JP 2021-154470 A 10/2021
(Continued)

OTHER PUBLICATIONS

International Search Report dated Dec. 7, 2021, issued in counterpart International Application No. PCT/JP2021/041262.
(Continued)

*Primary Examiner* — Veronica Martin
(74) *Attorney, Agent, or Firm* — WHDA, LLP

(57) ABSTRACT

An electric nailing machine capable of continuous driving is provided.
A driving unit 10 which drives a nail N supplied to a driving position a includes a cylinder unit 11 having a cylinder 12 and a piston 13, a driving rod 14 which is consecutively provided on the piston 13 and slidably penetrates a cylinder cap **12*b*, a driving spring 15 which biases the piston 13 in a driving direction, and a moving unit 16 which moves the piston 13 in a counter-driving direction against a biasing force of the driving spring 15 and has a brushless motor 17 and power converting means 18 which converts a rotary motion of the brushless motor 17 to a linear motion in the counter-driving direction of the piston 13, in which the power converting means 18 has a sector gear 21 rotated/driven by the brushless motor 17 and a rack gear 22 meshed with the sector gear 21 and mounted on the piston 13, in which, when the piston 13** moves to a predetermined posi-
(Continued)

tion in the counter-driving direction, meshing between the sector gear 21 and the rack gear 22 is disengaged.

3 Claims, 7 Drawing Sheets

(56) References Cited

FOREIGN PATENT DOCUMENTS

| | | | |
|---|---|---|---|
| JP | 2021-160030 | A | 10/2021 |
| WO | 2021/106496 | A1 | 6/2021 |

OTHER PUBLICATIONS

PCT/ISA/237, Written Opinion of the International Searching Authority dated Dec. 7, 2021, issued in counterpart International Application No. PCT/JP2021/041262 (w/machine translation).
Office Action dated Feb. 7, 2022, issued in counterpart JP Application No. 2022-503486, with English translation (6 pages).

* cited by examiner

NAILING MACHINE

TECHNICAL FIELD

The present invention relates to an electric nailing machine.

BACKGROUND ART

This type of nailing machines includes the one disclosed in Patent Literature 1, for example. This nailing machine 50 includes, as shown in FIG. 10, a nail supply unit 51 which supplies nails to a driving position and a driving unit 52 which drives the nail supplied to the driving position, and the driving unit 52 has a plunger 53 supported at the driving position of the nail, capable of approaching/separation, a spring (not shown) which biases the plunger 53 to a direction separating from the driving position of the nail, a rack gear 54 mounted on the plunger 53, a blade 55 which is mounted at a distal end of the plunger 53 and drives the nail supplied to the driving position, a motor 57 which is ON/OFF driven by a trigger switch 56 disposed on a handle portion, a drive gear 58 mounted on a rotating/drive shaft 57*a* of the motor 57, a driven shaft (not shown) disposed in parallel with the rotating/drive shaft 57*a*, a flywheel 59 rotatably supported by this driven shaft through a clutch mechanism (not shown), and a pinion 60 mounted on the driven shaft and meshed with the rack gear.

In this nailing machine 50, as shown in FIG. 11, when a worker grips the handle portion and pulls the trigger switch 56, the motor 57 is driven, a rotating/drive force of the motor 57 is transmitted from the drive gear 58 to the flywheel 59, and the flywheel 59 is rotated/driven. At this time, since the clutch mechanism is OFF, the flywheel 59 is not coupled with the driven shaft, the flywheel 59 idles with respect to the driven shaft, and though power transmission from the flywheel 59 to the driven shaft is shut down, after predetermined time has elapsed, the clutch mechanism is turned ON, the flywheel 59 and the driven shaft are coupled, a rotary motion of the flywheel 59 is transmitted to the driven shaft, and the driven shaft is rotated/driven. When the driven shaft is rotated/driven as above, the pinion 60 mounted on this driven shaft is also rotated integrally, the plunger 53 on which the rack gear 54 meshed with this is mounted is pushed out to a driving position side against the biasing force of the spring, a distal end of the blade 55 mounted on the distal end of the plunger 53 drives the nail supplied to the driving position, and the nail is driven into a nailed material W such as wood by this driving force.

CITATION LIST

Patent Literature

[PTL 1] Japanese Patent Application Publication No. 2007-90506

SUMMARY OF INVENTION

Technical Problem

In the aforementioned nailing machine 50, when the worker pulls the trigger switch 56, the flywheel 59 is immediately rotated/driven, but during a period until the predetermined time has elapsed, that is, during a period until the flywheel 59 is rotated at a constant speed, the clutch mechanism is not turned ON, a rotary force of the flywheel 59 cannot be transmitted to the driven shaft during that period, and the plunger 53 cannot be pushed out to a driving position side and thus, a certain degree of time is required until the nail is driven after the trigger switch 56 is pulled, which leads to a problem that the worker cannot sequentially drive nails.

Moreover, in the aforementioned nailing machine 50, the nails are driven with a constant driving force and thus, the driving force cannot be adjusted in accordance with a length or a thickness of the nail, which leads to another problem that a plurality of types of nails cannot be handled.

Thus, a first object of the present invention is to provide an electric nailing machine capable of sequential driving and moreover, a second object is to provide a nailing machine capable of handling a plurality of types of nails.

Solution to Problem

In order to solve the aforementioned problems, an invention according to claim 1 is to provide a nailing machine, characterized by including a nail supply unit which supplies a nail to a driving position and a driving unit which drives the nail supplied to the driving position, in which the driving unit has a cylinder unit having a cylinder with a cylinder cap formed of an elastic member and a piston sliding in the cylinder, a driving rod which is consecutively provided on the piston and slidably penetrates the cylinder cap, a driving spring which biases the piston in a driving direction, and a moving unit which moves the piston in a counter-driving direction against a biasing force of the driving spring, the moving unit has an electric motor and power converting means which converts a rotary motion of the electric motor to a linear motion in the counter-driving direction of the piston, and the power converting means has a sector gear which is rotated/driven by the electric motor and a rack gear which is meshed with the sector gear and is mounted on the piston, and it is set such that, when the piston moves to a predetermined position in the counter-driving direction, meshing between the sector gear and the rack gear is set to be disengaged.

An invention according to claim 2 is characterized in that, in the nailing machine of the invention according to claim 1, it is configured such that, when the driving rod drives the nail, air in a space defined by the cylinder and the piston is pushed out by the piston from the cylinder, and a driving-force adjustment unit which adjusts the driving force of the driving rod by adjusting push-out resistance of the air is provided.

An invention according to claim 3 is characterized in that, in the nailing machine of the invention according to claim 1 or 2, the nail supply unit performs supply to the driving position by sending out a roll nail in a tangent direction of a winding part of the roll nail.

Advantageous Effects of Invention

As described above, the nailing machine of the invention according to claim 1 includes the cylinder unit having the piston to which the driving rod is consecutively provided, the driving spring which biases the piston in the driving direction, and the moving unit which moves the piston in the counter-driving direction against the biasing force of the driving spring and has the power converting means which converts the rotary motion of the electric motor to the linear motion in the counter-driving direction of the piston, the power converting means has the sector gear which is rotated/driven by the electric motor and the rack gear which is meshed with the sector gear and is mounted on the piston, and it is set such that, when the piston is moved to a predetermined position in the counter-driving direction, the meshing between the sector gear and the rack gear is disengaged and thus, when the sector gear is rotated by the electric motor, the sector gear is meshed with the rack gear mounted on the piston, whereby the piston moves to the counter-driving direction, the biasing force is accumulated in the driving spring with that, and at the time when the piston has moved to the predetermined position in the counter-driving direction, that is, at the time when the meshing between the sector gear and the rack gear is disengaged, the biasing force accumulated in the driving spring is released, the piston moves in the driving direction by the biasing force, and the driving rod drives the nail supplied to the driving position.

As described above, since this nailing machine can drive one nail while the sector gear makes one rotation, unlike the conventional nailing machine which cannot drive a nail during a period until the flywheel rotates at a constant speed from the time when the worker pulls the trigger switch, such an effect can be obtained that the nails can be sequentially driven.

Moreover, since this nailing machine has the cylinder cap formed of the elastic member, an impact when the piston collides against the cylinder cap can be absorbed, components are hardly broken, and nail driving operability is favorable.

Furthermore, the nailing machine of the invention according to claim 2 is configured such that, when the driving rod drives the nail, the air in the space defined by the cylinder and the piston is pushed out by the piston from the cylinder and includes the driving-force adjustment unit which adjusts the driving force of the driving rod by adjusting the push-out resistance of the air and thus, the driving force can be adjusted in accordance with the length, the thickness and the like of the nail to be driven, and a plurality of types of the nails can be handled.

Furthermore, since the nail supply unit of the nailing machine of the invention according to claim 3 is configured to supply the roll nail to the driving position by sending out the roll nails in the tangent direction of the winding part of the roll nail, sending-out resistance of the roll nail is small, and the nail can be supplied to the driving position smoothly and reliably with a small force.

DESCRIPTION OF EMBODIMENT

Figure 1:
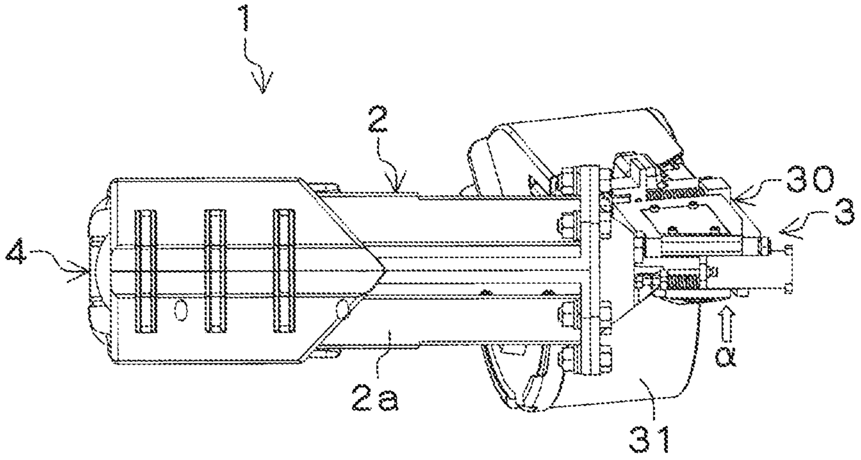
FIG. 1 is a plan view illustrating an embodiment of a nailing machine according to the present invention.

Hereinafter, an embodiment will be described by referring to drawings. As shown in FIGS. 1 to 6, this nailing machine 1 is constituted by a main body portion 2 in which a driving unit 10 which drives a nail supplied to a driving position a is accommodated in a casing 2*a*, a nail supply portion 3 which supplies the nail to the driving position a, and a power supply portion 4 detachably attached to the main body portion 2, and the main body portion 2 and the nail supply portion 3 are coupled with each other.

Figure 5:
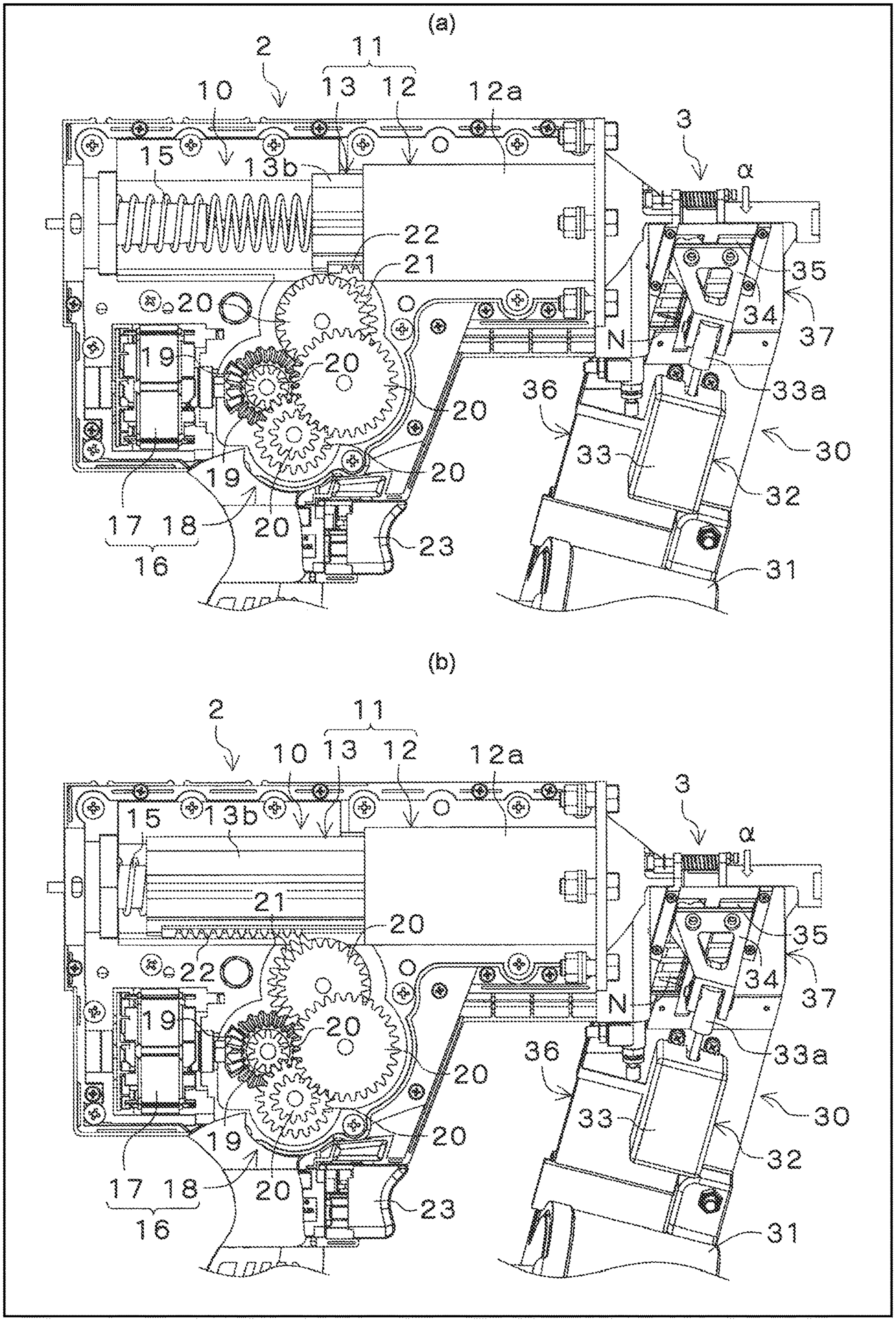
FIG. 5(*a*) is a partial left-side view illustrating a state (initial state) after driving with an upper left part of a casing in a main body portion of the nailing machine of the above removed, and FIG. 5(*b*) is a partial left-side view illustrating a state immediately before the driving with the upper left part of the casing in the main body portion of the nailing machine of the above removed.
Figure 6:
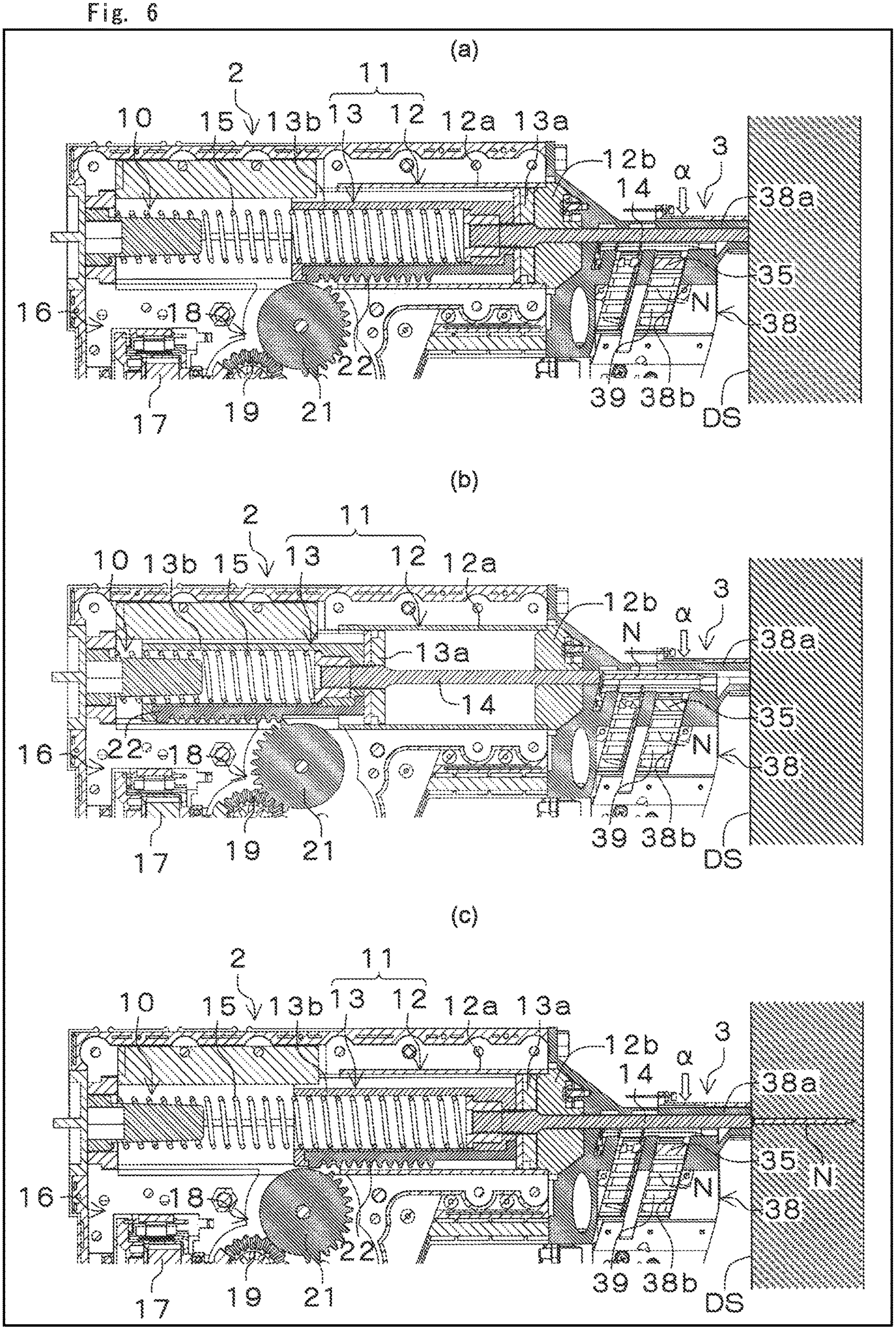
FIGS. 6(*a*) to 6(*c*) are partial vertical-sectional views along a shaft core of a piston, illustrating a nailing operation of the nailing machine of the above.

The driving unit 10 includes, as shown in FIGS. 5 and 6, a cylinder unit 11 having a cylinder 12 in which a cylinder cap 12*b* formed of an elastic member is fitted on one end of a cylindrical cylinder main body 12*a* and a piston 13 having a cylindrical piston rod 13*b* consecutively provided on a piston head 13*a* in sliding contact with an inner peripheral surface of the cylinder main body 12*a*, a driving rod 14 which extends in a driving direction from the piston head 13*a* and slidably penetrates the cylinder cap 12*b*, a driving spring 15 which biases the piston 13 in a driving direction and is internally attached to the cylindrical piston rod 13*b*, a moving unit 16 which moves the piston 13 in a counter-driving direction against a biasing force of the driving spring 15, and a trigger switch 23 capable of operating the moving unit 16, and the moving unit 16 is constituted by a brushless motor 17 and power converting means 18 which converts a rotary motion of the brushless motor 17 to a linear motion in the counter-driving direction of the piston 13.

The power converting means 18 has, as shown in FIGS. 5 (*a*) and 5 (*b*), a sector gear 21 rotated/driven by the brushless motor 17 through a pair of bevel gears 19 and a plurality of spur gears 20 and a rack gear 22 meshed with the sector gear 21 and mounted on the piston rod 13*b* of the piston 13, and it is set such that, as shown in FIG. 5 (*b*), the piston 13 moves in the counter-driving direction by counterclockwise rotation of the sector gear 21 meshed with the rack gear 22, and when the piston 13 moves to a predetermined position in the counter-driving direction, the meshing between the sector gear 21 and the rack gear 22 is disengaged.

Figure 7:
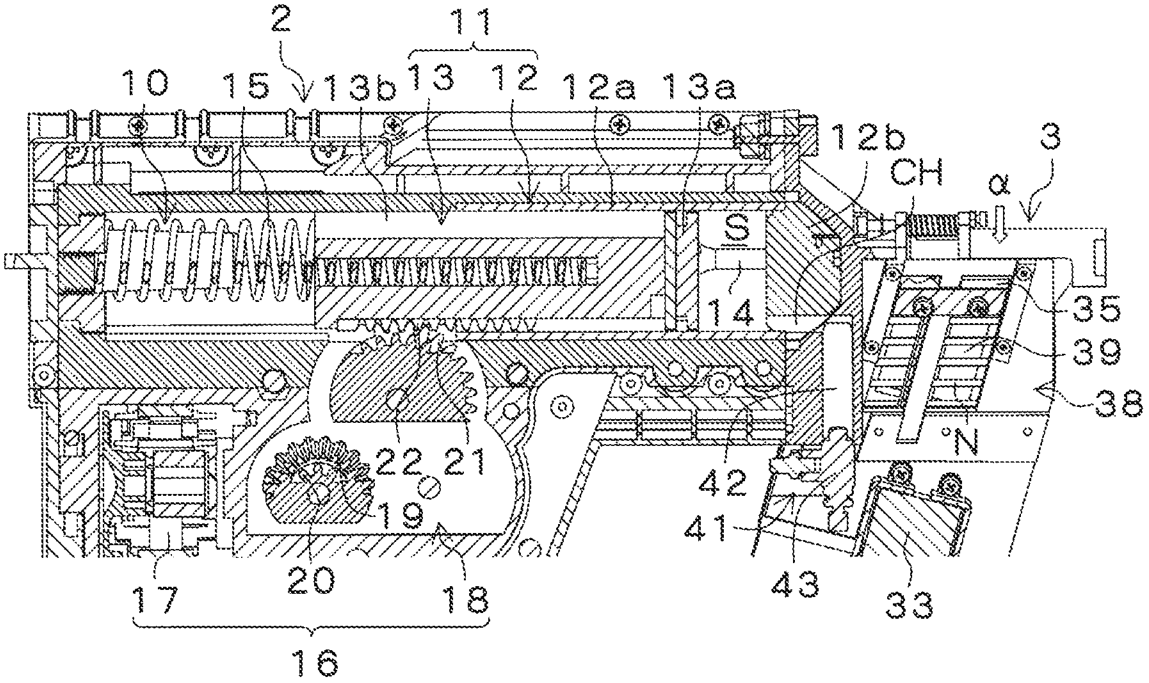
FIG. 7 is a sectional view along an A-A line in FIG. 2 in the nailing machine of the above.

In the cylinder cap 12*b* of the cylinder unit 11, as shown in FIG. 7, a communication hole CH communicating between an inside and an outside of the cylinder 12 is formed, and it is configured such that, when the driving rod 14 drives the nail, an air in a space S defined by the cylinder 12 and the piston head 13*a* is pushed out through the communication hole CH from the cylinder 12.

The nail supply portion 3 includes, as shown in FIGS. 1 to 5 and FIG. 7, a nail supply unit 30 which supplies nails to the driving position a and a driving-force adjustment unit 41 which adjusts a driving force of a nail N by the driving unit 10, and the driving-force adjustment unit 41 is configured to adjust the driving force of the driving rod 14 by adjusting push-out resistance of the air in the cylinder 12, which is pushed out by the piston 13.

Figure 2:
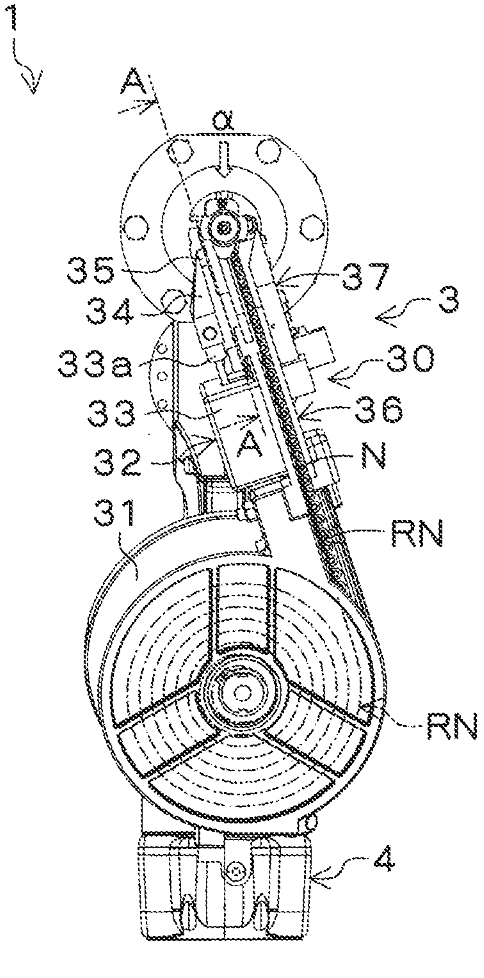
FIG. 2 is a front view illustrating the nailing machine of the above.
Figure 3:
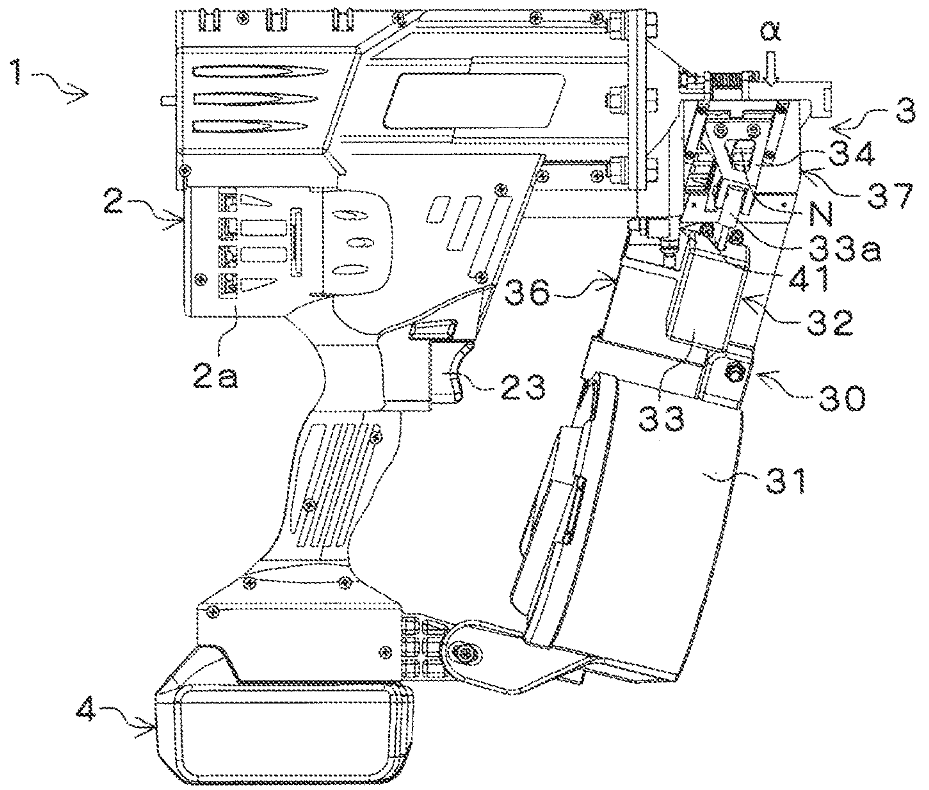
FIG. 3 is a left side view illustrating the nailing machine of the above.
Figure 4:
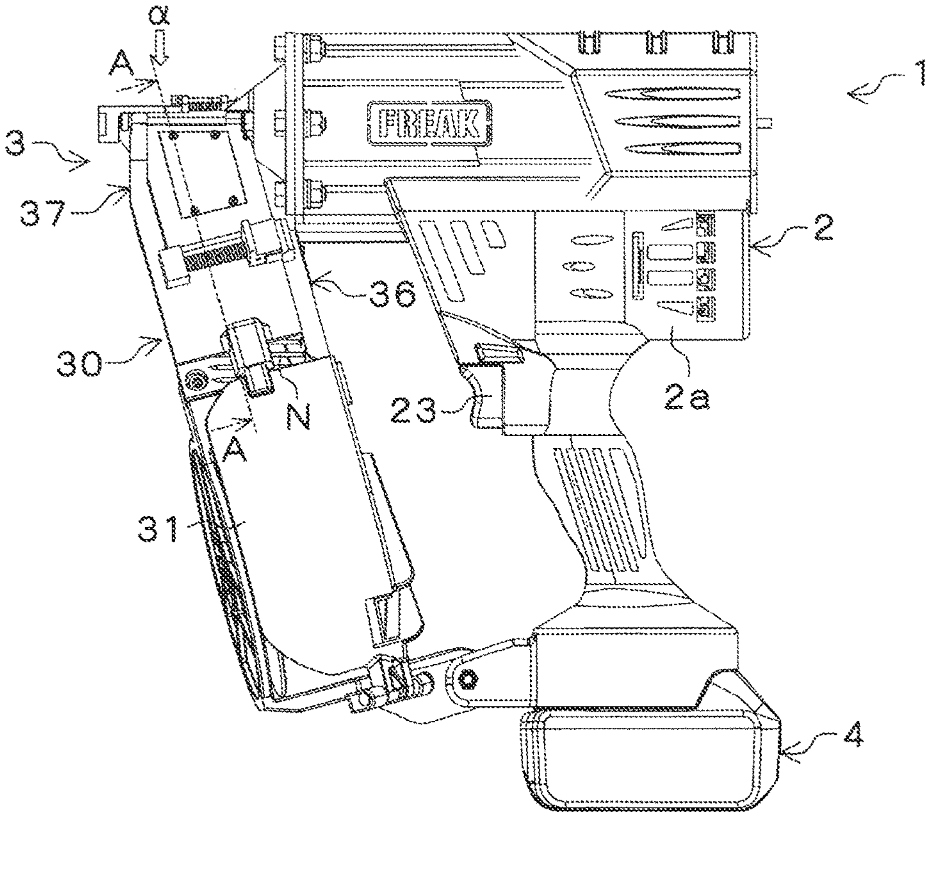
FIG. 4 is a right side view illustrating the nailing machine of the above.

The nail supply unit 30 includes, as shown in FIGS. 1 to 8, a nail-accommodating magazine 31 which accommodates roll nails RN in which a large number of nails N sequentially coupled through a wire are wound in a roll state, nail sending-out means 32 which sequentially sends out each of the nails N of the roll nail RN accommodated in the nail-accommodating magazine 31 to the driving position a, a guiding portion 36 which has a conveyance path for guiding the roll nail RN pulled out of the nail-accommodating magazine 31 to the driving position a, and a sandwiching portion 37 which sandwiches the roll nail RN sent out from the conveyance path of the guiding portion 36 in front of the driving position a, and as shown in FIG. 2, the guiding portion 36 is disposed so that the roll nail RN accommodated in the nail-accommodating magazine 31 in the wound state is pulled out in a tangent direction of the winding part.

The nail sending-out means 32 includes a linear electromagnetic actuator 33 having a mover 33*a* which reciprocates in a sending-out direction of the roll nail RN, a swing member 34 supported by the mover 33*a* of the linear electromagnetic actuator 33, capable of swing so that a distal end side approaches to/separates from the roll nail RN, a spring, not shown, which biases the distal end side of the swing member 34 to the roll nail RN side, and a lock claw 35 which is mounted on the distal end of the swing member 34 and locks the nail N of the roll nail RN, and it is configured such that, by means of an extending operation of the mover 33*a* of the linear electromagnetic actuator 33, the nail N of the roll nail RN in a state of being locked by the lock claw 35 is pushed out to the driving position a side, whereby the roll nail RN is moved to the nail driving position a side.

Figure 8:
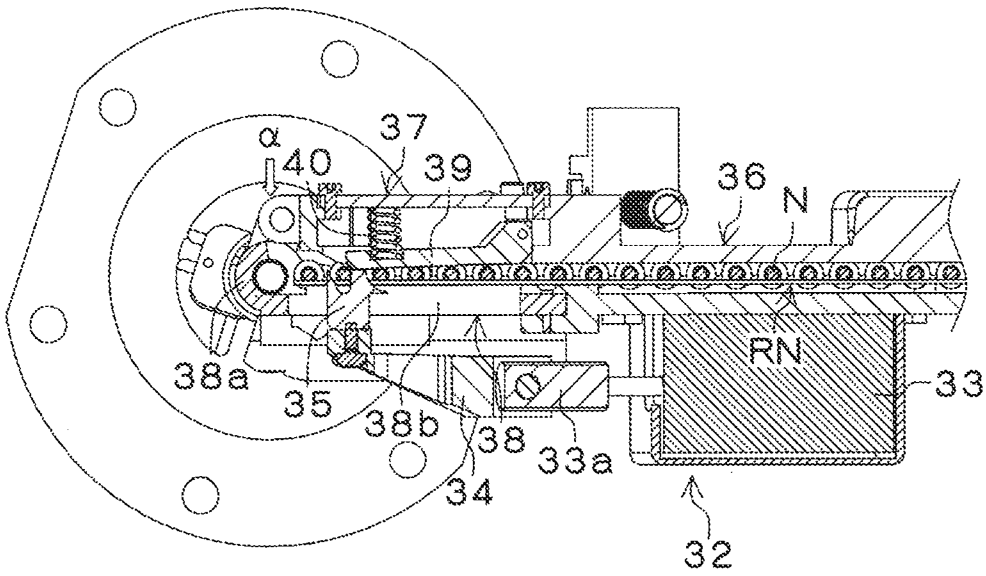
FIG. 8 is a sectional view along the A-A line in FIG. 4 in the nailing machine of the above.
Figure 9:
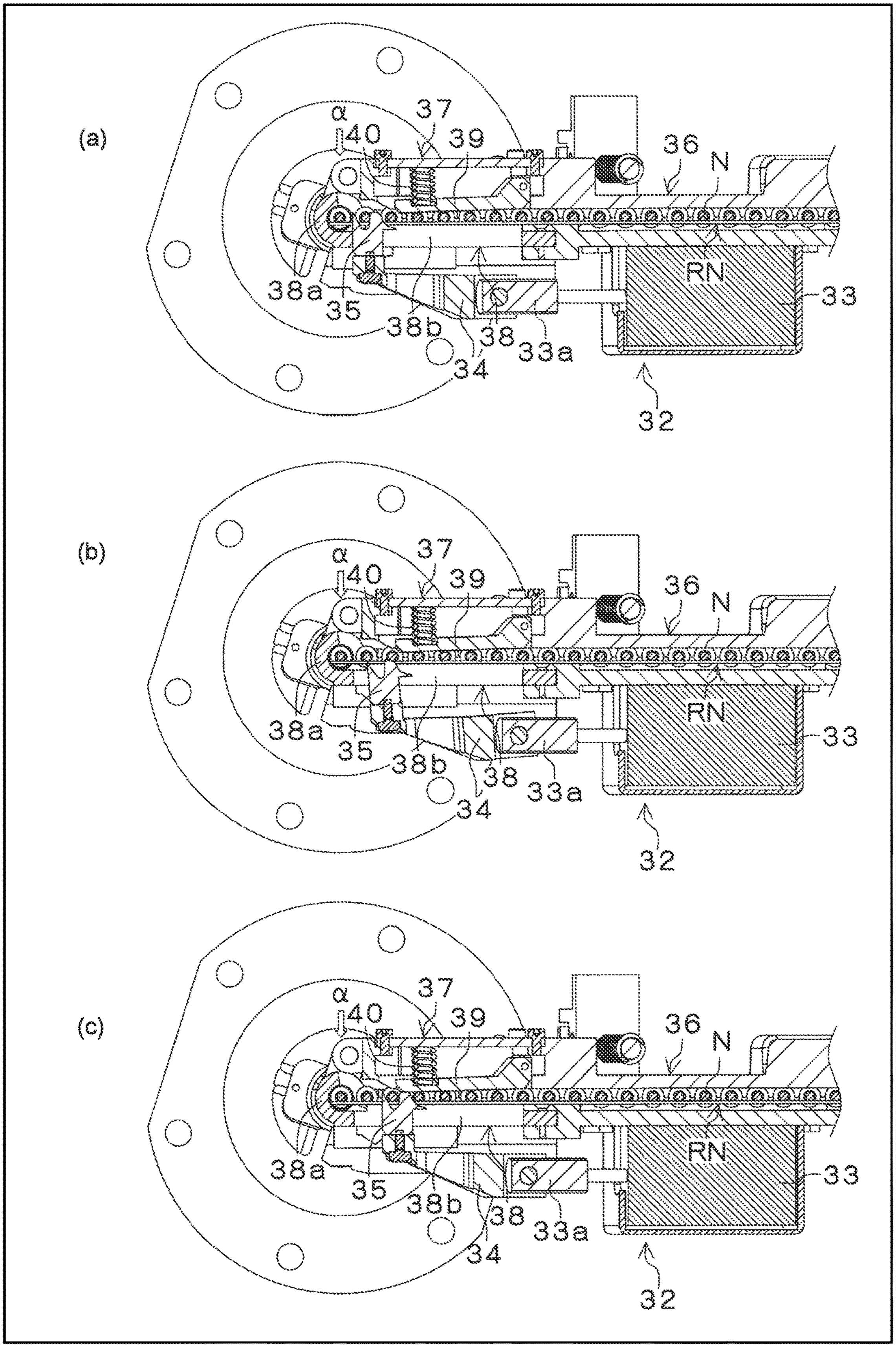
FIGS. 9(*a*) to 9(*c*) are sectional views along the A-A line in FIG. 4, illustrating a nail supply operation in the nailing machine of the above.
Figure 10:
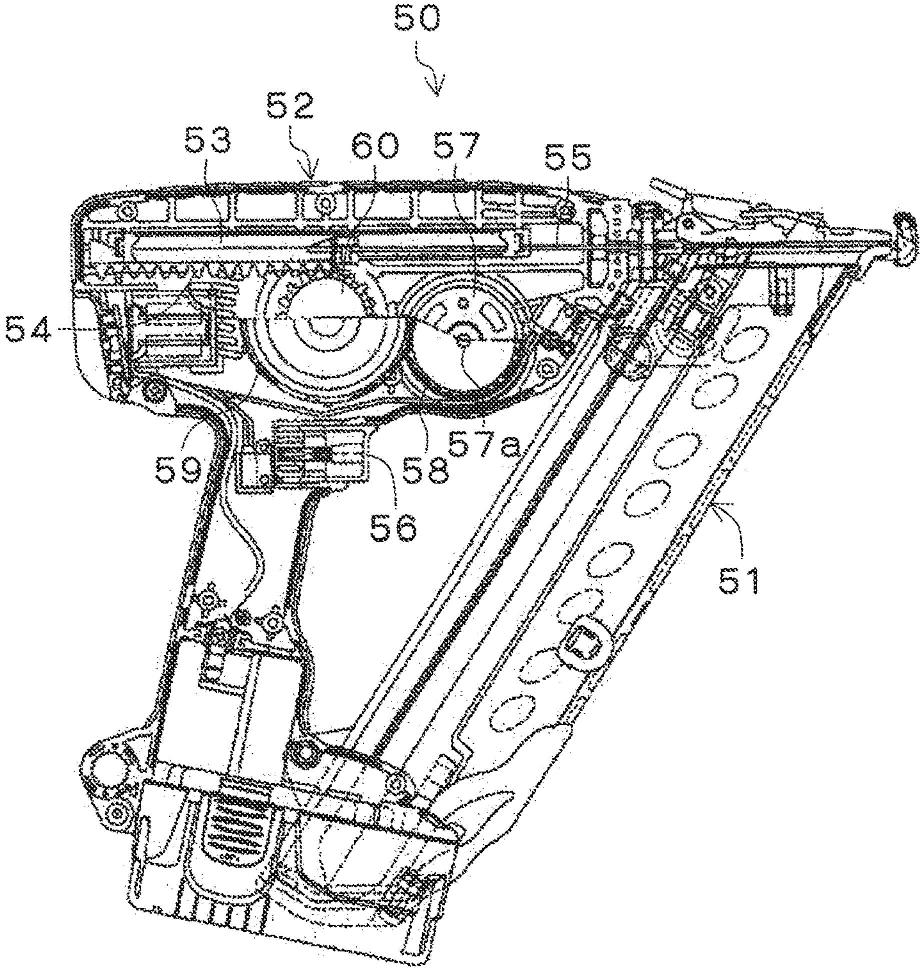
FIG. 10 is a broken right-side view illustrating an internal structure of a conventional electric nailing machine.
Figure 11:
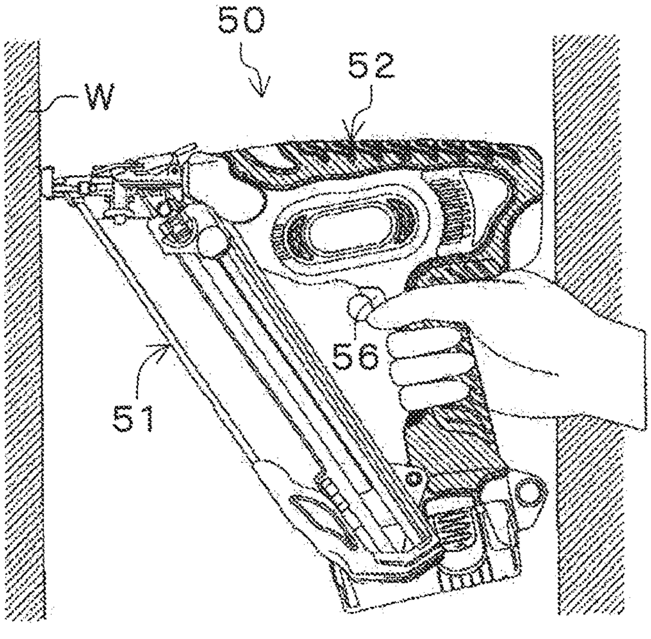
FIG. 11 is a side view illustrating a nailing work using the electric nailing machine of the above.

The lock claw 35 has, as shown in FIG. 8, a locking surface which locks the nail N and a guide surface inclined while being curved to an opposite side (counter-sending out direction side of the roll nail NR) from an upper end of this locking surface, and as shown in FIG. 9(*a*), by means of the extending operation of the mover 33*a* of the linear electromagnetic actuator 33, a second nail N from the distal end, which is locked by the locking surface, is pushed out to the driving position a side, whereby the nail N at the distal end is moved to the driving position a. After that, by means of a withdrawing operation of the mover 33*a* of the linear electromagnetic actuator 33, the lock claw 35 retreats to the counter-sending out direction of the roll nail RN, but at that time, as shown in FIG. 9(*b*), while the distal end side of the swing member 34 is being separated from the roll nail RN against the biasing force of the spring which is biasing to the roll nail RN side so that the third nail N from the distal end follows a guiding surface of the lock claw 35, the lock claw 35 rides over the third nail N from the distal end, and as shown in FIG. 9(*c*), the nail N is locked by the locking surface of the lock claw 35. Then, after the nail N located at the driving position a is driven, the nail N at the distal end is sequentially supplied to the driving position a by repeating the similar nail supply operation.

The sandwiching portion 37 includes a base plate 38 on which the roll nail RN is caused to follow, a sandwiching piece 39 which sandwiches the roll nail RN caused to follow this base plate 38 between it and the base plate 38 and is supported capable of swing so that a distal side approaches to/separates from the roll nail RN, and a spring 40 which biases the distal end side of the sandwiching piece 39 to the roll nail RN side, and it is configured such that the distal end of the sandwiching piece 39 sandwiches the roll nail RN in the vicinity on the counter-sending out side of a moving range of the lock claw 35.

The base plate 38 has, as shown in FIG. 6 and FIG. 8, an arc portion 38*a* whose distal end side is curved in a semi-arc shape so as to surround the nail driving position a and a window 38*b* into which the lock claw 35 can enter is formed so that the lock claw 35 advances/retreats in the window 38*b* of the base plate 38 by advancing/retreating of the mover 33*a* of the linear electromagnetic actuator 33.

The driving-force adjustment unit 41 includes, as shown in FIG. 7, a valve 43 which is connected to the communication hole CH formed in the cylinder cap 12*b* through an air channel 42 and whose opening degree can be adjusted by a manual operation, and by adjusting the opening degree of the valve 43, the push-out resistance of the air in the cylinder 12 pushed out by the piston 13 can be adjusted. Therefore, by adjusting the push-out resistance of the air in the cylinder 12 by adjusting the opening degree of the valve 43, the driving force of the driving rod 14 can be adjusted in accordance with the length or the thickness or the like of the nail N, and a plurality of types of nails can be handled.

Moreover, though detailed explanation is omitted, a safety device which prevents unintended driving of the nail N is mounted in this nailing machine 1, and unless a driving-out port for the nail N provided in the nail supply portion 3 is pressed onto a driving surface for the nail N of a wall surface or the like, the brushless motor 17 or the linear electromagnetic actuator 33 is not operated even if the trigger switch 23 is pulled, the driving rod 14 which has advanced to the driving position a by means of the previous driving operation does not retreat to the counter-driving direction from the driving position a, and the nail N is not supplied to the driving position a.

In the nailing machine 1 configured as above, as shown in FIG. 6(*a*), when the trigger switch 23 is pulled in a state where the driving-out port for the nail N provided in the nail supply portion 3 is pressed onto the driving surface DS for the nail N on the wall surface or the like so as to cancel the operation of the safety device, the brushless motor 17 is operated, the sector gear 21 is rotated in the counterclockwise direction and is meshed with the rack gear 22 mounted on the piston rod 13*b*, and as shown in FIG. 6(*b*), the piston 13 is withdrawn in the counter-driving direction, while the driving spring 15 is compressed and thus, the driving rod 14 located at the driving position a is also retreated from the driving position a to the counter-driving direction, and the nail N is supplied by the nail sending-out means 32 to the driving position a.

When the piston 13 is withdrawn to a predetermined position in the counter-driving direction, the meshing between the sector gear 21 and the rack gear 22 is disengaged and thus, as shown in FIG. 6(*c*), the piston 13 is driven out to the driving direction by the biasing force of the driving spring 15, which has been accumulated by being compressed, and with that, the nail N supplied to the driving position a is driven into the driving surface DS by the driving rod 14.

As described above, since this nailing machine 1 can drive one piece of the nail N while the sector gear 21 makes one rotation, unlike the conventional nailing machine which cannot drive a nail during a period until the flywheel rotates at a constant speed from the time when the worker pulled the trigger switch, the nails N can be continuously driven.

Moreover, since this nailing machine 1 has the cylinder cap 12*b* formed of an elastic member, an impact when the piston head 13*a* collides against the cylinder cap 12*b* can be absorbed, components are hardly broken, and driving operability for the nails N is favorable.

Furthermore, since the nail supply unit 30 of this nailing machine 1 is so configured that the roll nail RN is sent out in the tangent direction of the winding part of the roll nail RN accommodated in the nail-accommodating magazine 31 and is supplied to the driving position a, the sending-out resistance of the roll nail RN is small, and the nail N can be supplied to the driving position a smoothly and reliably with a small force.

INDUSTRIAL APPLICABILITY

The present invention can be applied to electric nailing machines.

REFERENCE SIGNS LIST

1 Nailing machine
2 Main body portion
3 Nail supply portion
4 Power supply portion
10 Driving unit
11 Cylinder unit
12 Cylinder
**12*a*** Cylinder main body
**12*b*** Cylinder cap
13 Piston
**13*a*** Piston head
**13*b*** Piston rod
14 Driving rod
15 Driving spring
16 Moving unit
17 Brushless motor
18 Power converting means
19 Bevel gear
20 Spar gear
21 Sector gear
22 Rack gear
30 Nail supply unit
31 Nail-accommodating magazine
32 Nail sending-out means
33 Linear electromagnetic actuator
**33*a*** Mover
34 Swing member
35 Lock claw
36 Guiding portion
37 Sandwiching portion
38 Base plate
**38*a*** Arc portion
**38*b*** Window
39 Sandwiching piece
40 Spring
41 Driving-force adjustment unit
42 Air channel
43 Valve
CH Communication hole
DS Driving surface
N Nail
RN Roll nail
S Space
α Driving position

The invention claimed is:

1. A nailing machine, comprising:
a nail supply unit which supplies a nail to a driving position; and
a driving unit which drives the nail supplied to the driving position, wherein
the driving unit has:
a cylinder unit which has a cylinder having a cylinder cap formed of an elastic member and a piston which slides in the cylinder;
a driving rod which is consecutively provided on the piston and slidably penetrates the cylinder cap,
a driving spring which biases the piston in a driving direction; and
a moving unit which moves the piston in a counter-driving direction against a biasing force of the driving spring;
the moving unit has:
an electric motor; and
power converting means which converts a rotary motion of the electric motor to a linear motion in the counter-driving direction of the piston; and
the power converting means has a sector gear set in rotary motion and driven by the electric motor and a rack gear meshed with the sector gear and is mounted on the piston and is set such that, when the piston moves to a predetermined position in the counter-driving direction, meshing between the sector gear and the rack gear is disengaged to release the driving spring, and the drive spring is released due to only disengagement of meshing between the sector gear and the rack gear, thereby moving the piston to drive the nail.

2. The nailing machine according to claim 1, wherein
when the driving rod drives the nail, air in a space defined by the cylinder and the piston is pushed out by the piston from the cylinder, and a driving-force adjustment unit which adjusts the driving force of the driving rod by adjusting push-out resistance of the air is provided; and
the driving-force adjustment unit includes a valve, and the valve is configured to adjust the push-out resistance of the air.

3. The nailing machine according to claim 1, wherein
the nail supply unit performs supply to the driving position by sending out a roll nail in a tangent direction of a winding part of the roll nail, and the tangent direction is aligned with an outer circumference of the roll nail.

* * * * *